Figure 1:
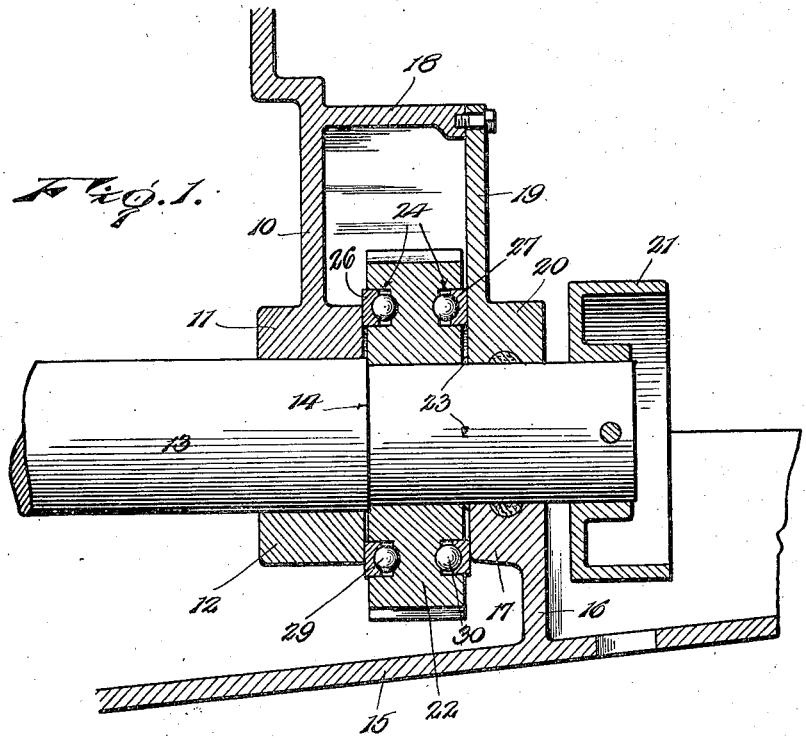

July 24, 1923.   1,462,938

F. E. KNAPP

COMBINED GEAR AND THRUST BEARING

Filed March 26, 1921

Inventor

Floyd E. Knapp.

By Lacey & Lacey, Attorneys

Patented July 24, 1923.

1,462,938

UNITED STATES PATENT OFFICE.

FLOYD E. KNAPP, OF ALLERTON, IOWA.

COMBINED GEAR AND THRUST BEARING.

Application filed March 26, 1921. Serial No. 455,792.

*To all whom it may concern:*

Be it known that I, FLOYD E. KNAPP, citizen of the United States, residing at Allerton, in the county of Wayne and State of Iowa, have invented certain new and useful Improvements in Combined Gear and Thrust Bearings, of which the following is a specification.

This invention relates to an improved combined thrust bearing and gear for internal combustion engines, being particularly designed for use in connection with Ford engines, and has as one of its principal objects to provide a device which will serve both the function of a timing gear and an end thrust bearing for the engine crank shaft.

The invention has as a further object to provide a gear and bearing so constructed that the functioning of the device as a bearing will not interfere with the functioning of the device as a timing gear and vice versa.

A still further object of the invention is to provide a gear and bearing which will rigidly sustain the crank shaft of the engine against endwise movement.

And the invention has as a still further object to provide a gear and bearing which may be readily assembled, which may be easily installed, and which will require no structural change in the engine crank shaft or other parts.

Other and incidental objects will appear hereinafter.

Figure 2:
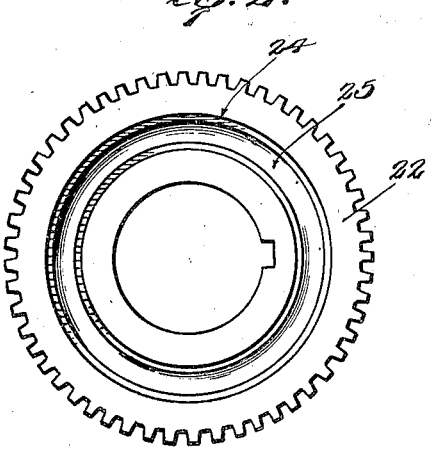
Figure 3:
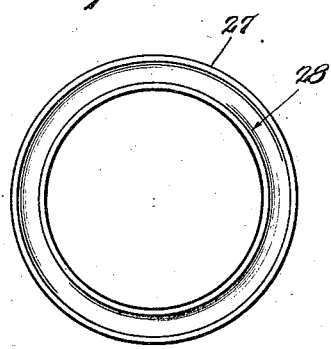

In the drawing:

Figure 1 is a fragmentary sectional view showing my improved gear and bearing in connection with a Ford engine, Figure 2 is a face view of the gear, the thrust ring at the adjacent side of the gear being removed, and Figure 3 is a face view looking at the inner side of one of the thrust rings.

As is well known, the crank shaft of a Ford engine is subjected to unusual end thrust. This is mostly due to the fact that forward pressure upon the clutch pedal of the engine to engage the low speed gears results in a rearward strain upon the crank shaft. Consequently, under ordinary conditions, the main crank shaft bearings soon become worn, allowing end play of the crank shaft. Such end play of the crank shaft tends, of course, to throw the connecting rods out of alinement and cause uneven wear upon the cylinders and pistons as well as to also cause the transmission gears to mesh improperly. Further, end play of the crank shaft operates to disarrange the proper relation of certain of the parts of the magneto with the result that the engine becomes extremely hard to start. The present invention, therefore, seeks to overcome these various disadvantages by providing a thrust bearing for rigidly sustaining the engine crank shaft against endwise movement while at the same time, the bearing will be embodied in one of the timing gears of the engine so that no structural change in the engine will be necessary to accommodate the bearing.

Referring now more particularly to the drawing, I have, for convenience, shown my improved bearing and gear in connection with a Ford engine. The engine block is indicated at 10, this block being formed at its forward end with the upper half 11 of the main crank shaft bearing. Bolted to said half of the bearing is the lower half 12 thereof and journaled through the bearing is the engine crank shaft 13. Near the forward end of the bearing, the crank shaft is, as is usual, provided with an annular shoulder 14. The crank case of the engine is indicated at 15 and rising from the crank case is a cross web 16 carrying the lower half 17 of a front gland for the shaft. Extending forwardly from the forward end of the engine block is a timing gear case 18 and closing said case is a cover 19 carrying the upper half 20 of the front gland, the half 20, of course, mating with the half 17. At its forward end, the crank shaft carries the usual pulley 21. All of this structure is well known, being in common use.

Coming now more particularly to the subject of the present invention, I employ a gear 22 corresponding in diameter to the usual small timing gear of the engine. This gear is formed to fit upon the forward end portion of the engine crank shaft abutting the shoulder 14 and at its periphery is provided with teeth to mesh with the usual large timing gear of the engine so that the gear 22 is adapted to supplant the customary small timing gear of the engine. Securing the gear 22 to the shaft is an appropriate key and preferably the shaft is formed at the forward side of said gear with a plurality of circumferentially spaced spurs 23 locking the gear against the shoulder 14, it being easily possible to provide the spurs by simply striking up the metal of the shaft. The gear will thus be confined between the front main crank shaft bearing and the front gland for said shaft to cooperate with the large timing gear of the engine.

Formed in the opposite side faces of the gear 22 in concentric relation to the axis of the gear, are oppositely disposed annular raceways 24 in the bottom walls of which are provided annular grooves 25. Freely fitting in said raceways are thrust rings which, for convenience, have been indicated at 26 and 27 respectively. At their inner sides these rings are, as shown in Figure 3, provided with annular grooves 28 similar to the grooves 25, the grooves of the rings registering, of course, with the grooves of the raceways. Confined by the ring 26 is a series of balls or anti-friction devices 29 and confined by the ring 27 is a series of balls or anti-friction devices 30, the balls fitting in the registering grooves 25 and 28 for movement therein.

As will now be understood in view of the preceding description, the series of balls 29 will sustain the ring 26 to abut the main crank shaft bearing at its forward end. Thus, frictional contact between said ring and the bearing will hold the ring stationary, thereby permitting movement of the balls relative to the ring so that the balls will coact between the gear and said ring for rigidly supporting the engine crank shaft against rearward endwise movement. Similarly, the series of balls 30 will sustain the ring 27 to coact with the front gland of the crank shaft at its rear end so that frictional engagement between said ring and the bearing will hold this ring stationary. Accordingly, the balls 30 will coact between the gear and said ring for rigidly supporting the crank shaft against forward endwise movement. Thus, the crank shaft will be held against end play in either one direction or the other so that all of the troubles incident to end play of the crank shaft will be eliminated. Furthermore, as will be seen, the combined gear and bearing may be readily installed or removed while no structural change whatever in the engine will be required to accommodate the device.

Having thus described the invention, what is claimed as new is:

1. A device of the character described including a gear provided in opposite sides thereof with grooves, thrust rings fitting in said grooves to be supported by the gear, and anti-friction devices disposed within the grooves bearing between the gear and said rings.

2. The combination with an engine crank shaft and spaced elements surrounding the shaft and having confronting parallel faces at a right angle to the axis of the shaft, one of said elements constituting a bearing and the other a gland for said shaft, of a timing gear mounted upon the shaft between said elements, anti-friction devices at opposite sides of the gear, and thrust rings bearing between said anti-friction devices and said elements centering the gear between the elements and having flat faces resting against said first mentioned faces directly sustaining end thrust upon the shaft in opposite directions.

In testimony whereof I affix my signature.

FLOYD E. KNAPP. [L. S.]